Aug. 30, 1955     H. J. BOWMAN     2,716,691
METHOD AND APPARATUS FOR WELDING TUBING
Filed Feb. 4, 1954     5 Sheets-Sheet 1
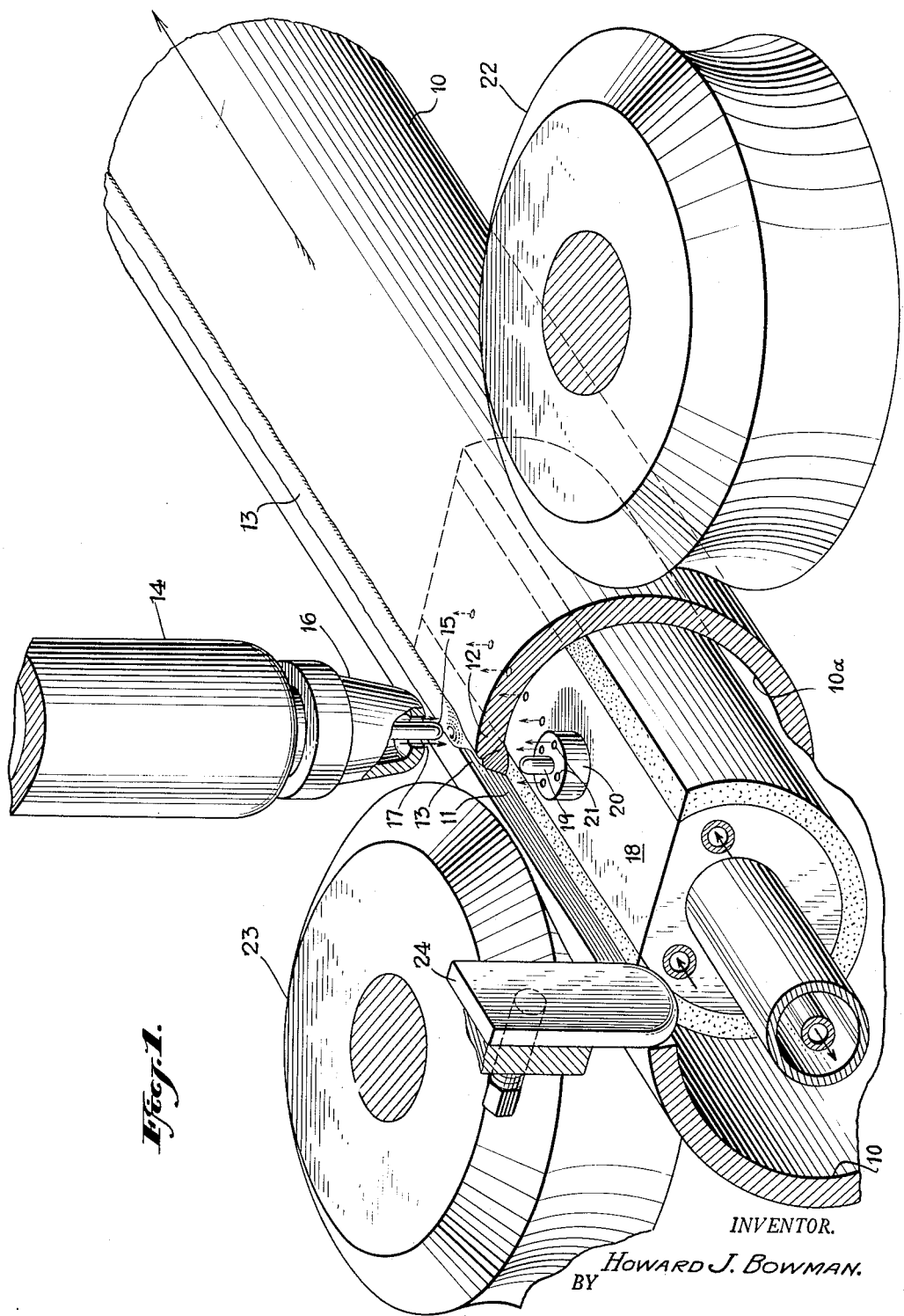
INVENTOR.
HOWARD J. BOWMAN.
BY Ward, Neal, Haselton, Orme & McElhannon.
ATTORNEYS.

Aug. 30, 1955                H. J. BOWMAN                 2,716,691
            METHOD AND APPARATUS FOR WELDING TUBING
Filed Feb. 4, 1954                              5 Sheets-Sheet 2
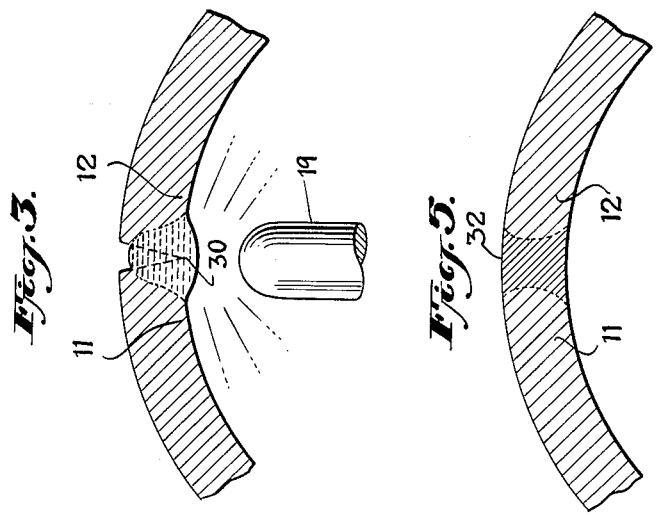
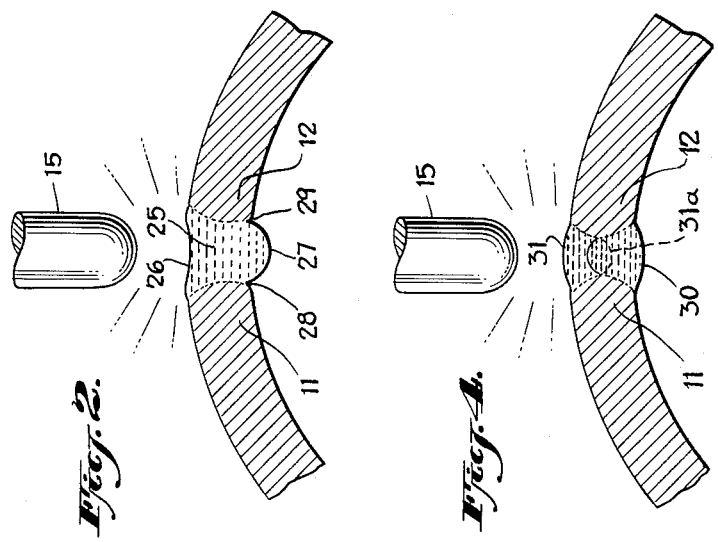
INVENTOR.
HOWARD J. BOWMAN.
BY
Ward, Neal, Haselton, Orme & McElhannon
ATTORNEYS.

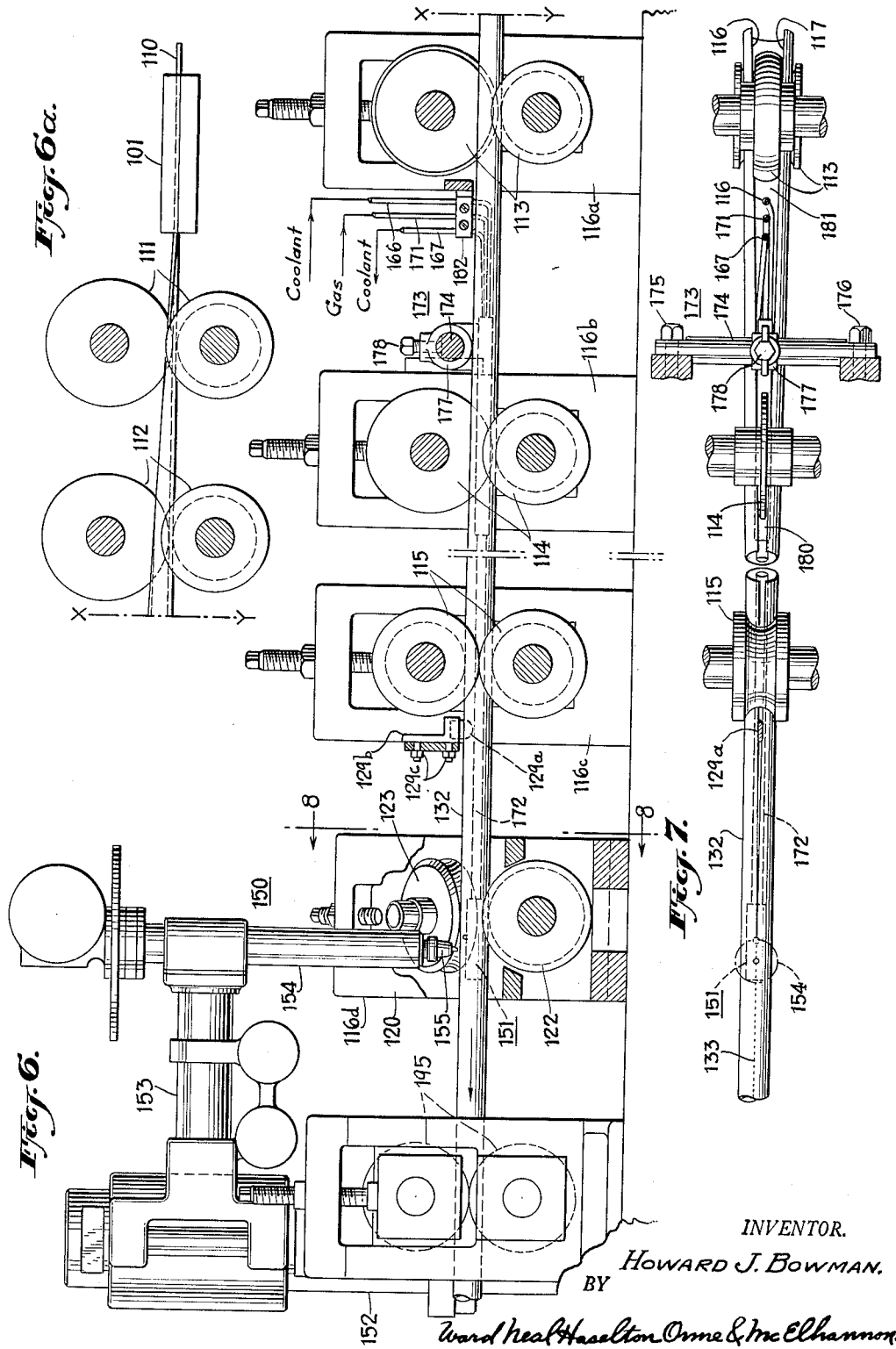

Aug. 30, 1955  H. J. BOWMAN  2,716,691
METHOD AND APPARATUS FOR WELDING TUBING
Filed Feb. 4, 1954  5 Sheets-Sheet 4
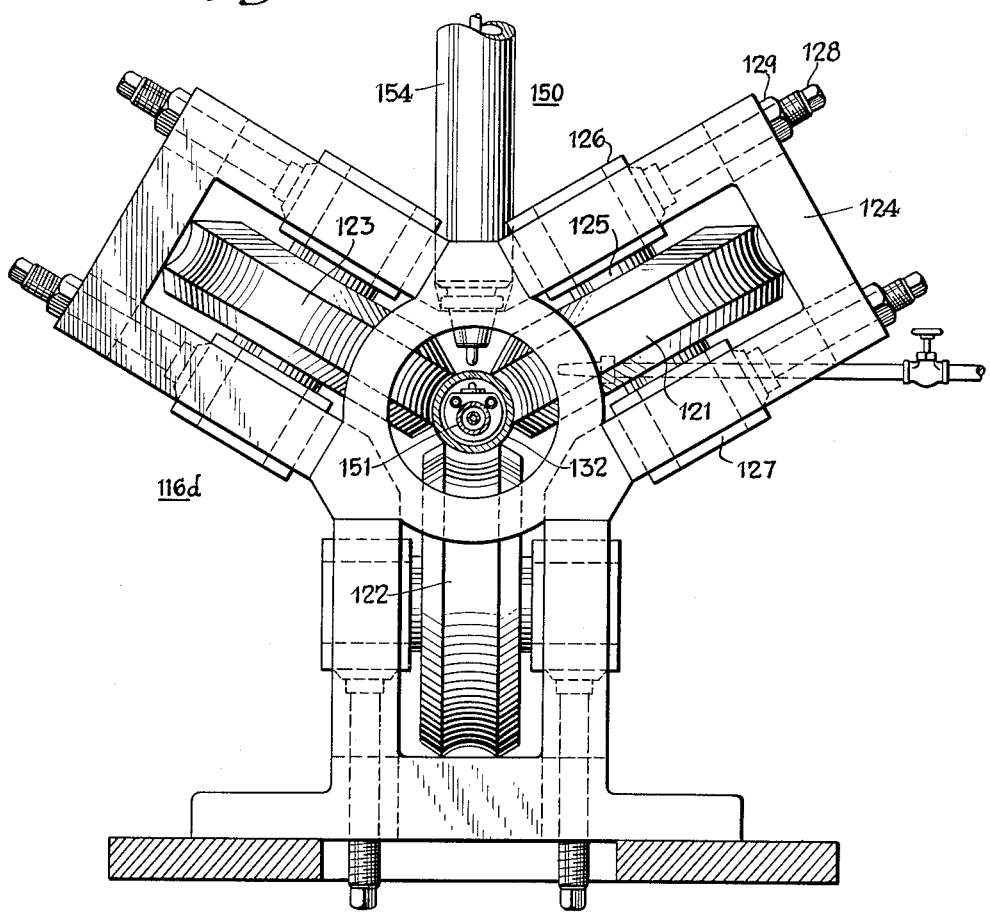
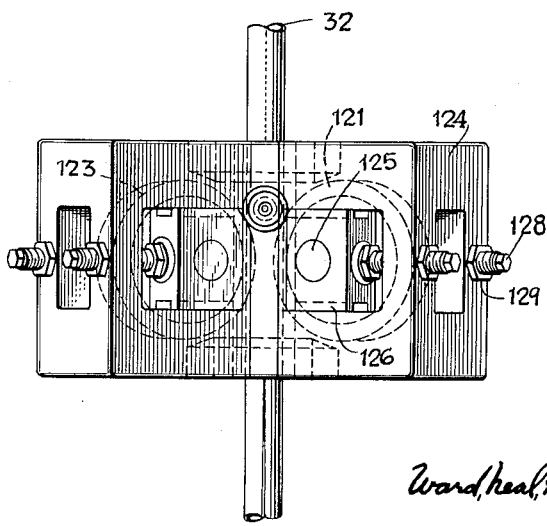
INVENTOR.
HOWARD J. BOWMAN
BY
Ward, Neal, Haselton, Orme & McElhannon.
ATTORNEYS.

Aug. 30, 1955
H. J. BOWMAN
2,716,691
METHOD AND APPARATUS FOR WELDING TUBING
Filed Feb. 4, 1954
5 Sheets-Sheet 5
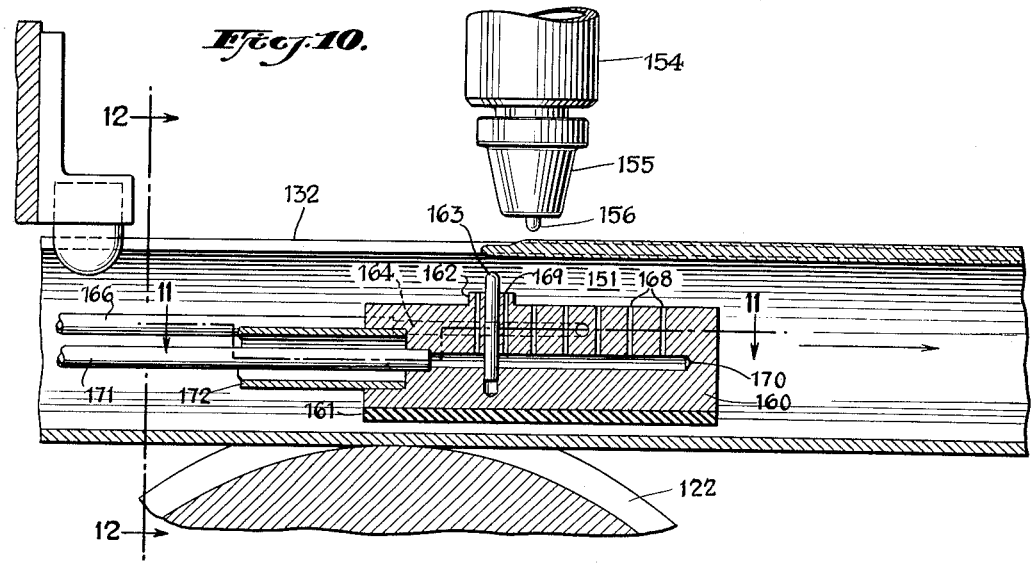
INVENTOR.
HOWARD J. BOWMAN.
BY
Ward Neal Haselton Orme & McElhannon
ATTORNEYS.

United States Patent Office 2,716,691
Patented Aug. 30, 1955

2,716,691

METHOD AND APPARATUS FOR WELDING TUBING

Howard J. Bowman, East Troy, Wis., assignor to Trent Tube Company, East Troy, Wis., a corporation of Wisconsin Application February 4, 1954, Serial No. 408,221

5 Claims. (Cl. 219—10)

This invention pertains to improvements in methods and apparatus for the production of welded seam tubing.

The conventional method of producing welded seam tubing consists in forming initially flat metal strip into tubular form by feeding through a series of appropriately contoured forming rolls until a circular section is obtained with the opposite edges of the strip abutting in a more or less V-shaped seam. Thereupon the thus formed tubular stock is fed under an arc welding unit mounting an electrode which projects downwardly above the seam of the tube. An arc is struck so that as the tubular stock is fed progressively past and beneath the electrode, the arc melts and fuses together the abutting edges of the seam into a continuous welded joint.

The weld produced in this way is objectionable in a number of respects. On the exterior of the tube the weld seam is concave in cross section, while the tube interior is convex or crowned in cross section, and forms a rib projecting radially inward toward the tube axis and extending along the weld seam in more or less irregular or meandering fashion. This sectional contour of the weld is apparently due to the action of gravity causing a sagging of the metal rendered molten whereby concave and convex sectional curvatures are imparted to the weld joint exteriorly and interiorly, respectively, of the tube. In addition to this, the molten metal on cooling contracts and draws away from the contiguous inner surface portions of the tube, thus producing grooves which are recessed below the inner arcuate contour of the tube, these grooves likewise extending more or less irregularly longitudinally along the opposite sides of the inner crowned or ribbed portion of the weld joint. These grooves are highly objectionable in that they cannot be completely removed by subsequent drawing or swaging operations. They thus remain in the finished tube as clearly visible defects productive of flaws in production and of contamination, corrosion and possible failure in use.

I propose in accordance with the present invention to eliminate these defects resulting from conventional welding practices, by the employment of a pair of arc welding units disposed, respectively, interiorly as well as exteriorly of the tube along the weld seam. The exterior unit is mounted above the traverse of the tubular stock to be welded, with its welding electrode projecting downwardly toward the tube seam to be welded. The interior unit is oppositely mounted on a supporting mandrel extending along the tube interior, with the welding electrode of this unit projecting upwardly toward the tube seam to be welded.

The inner welding electrode may be disposed in vertical alignment with the outer electrode or slightly in advance thereof in the direction of traverse of the tube, depending on such factors as the speed of traverse of the tubing, the wall thickness of the tubular stock, the extent of penetration and rate of solidification of the metal rendering molten by the outer and inner electrodes, respectively, during welding. Ordinarily the inner electrode is adjusted slightly in advance of the outer electrode in the direction of tube traverse, thus to weld the abutting tube edges first along its inner seam and permit solidification of the metal before the outer seam is welded.

As a result of this dual welding, the weld seam produced is of crowned cross section both exteriorly and interiorly of the tubing and thus forms ribs extending along the weld seam on both the inner and outer surfaces. These ribs moreover coalesce smoothly with the contiguous inner and outer arcuate surfaces of the tubing, with no recessing or grooving of the character above discussed. When, therefore, the tubing thus welded according to this invention is subsequently drawn and swaged in the usual manner, the metal of the weld joint is cold worked and compacted to a smooth arcuate sectional contour confluent with, and having the same wall-thickness as, the remainder of the tubing.

The invention is applicable to the welding of tubular stock of any wall-thickness and made of any type of metal. It is particularly advantageous as applied to the welding of relatively thick-walled stock on the order of ⅛″ to ⅜″. It is likewise especially adapted to the contactual, inert-gas-shielded, arc welding of tubing formed of the various corrosion resisting or stainless steels or alloys, such as the various austenitic chromium-nickel steels and alloys.

Having thus described the invention in general terms, reference will now be had for a more detailed description, to the accompanying drawings wherein:

Fig. 1 is a more or less schematic, perspective view, illustrative of the welding of a pipe section in accordance with the present invention, this view showing the essential components and assembly of the welding units and associated feed and squeeze rolls for feeding the pipe section past the welding units.

Fig. 2 is a fragmentary cross sectional view of a pipe section as welded in accordance with conventional practices by the use of an exterior welding electrode only, mounted above the weld seam.

Fig. 3 is a fragmentary cross sectional view of a pipe section after welding with only the inner electrode of the apparatus illustrated in Fig. 1; while Fig. 4 is a similar view showing the additional subsequent further welding of the Fig. 3 section by the exterior electrode of the Fig. 1 assembly.

Fig. 5 is a fragmentary section of the resulting welded tubing, showing the weld joint of Fig. 4 after the pipe section as thus welded has been subsequently drawn and swaged.

Figs. 6–12, inc., illustrate a modification of the invention wherein the tubing is formed continuously from initially flat metal strip, and thereupon continuously welded both exteriorly and interiorly along the tube seam, thus to produce welded seam tubing as a continuous and progressive operation. Figs. 6 and 6a show in side elevation the essential components of this apparatus including the forming rolls together with the welding apparatus, Fig. 6a being a continuation at x—y of the apparatus of Fig. 6. Fig. 7 is a plan view of the Figs. 6 and 6a apparatus. Fig. 8 is an elevation taken at 8—8 of Fig. 6, to illustrate the positioning of the final forming and squeeze rolls for the tubing and the yoke mounting the same. Fig. 9 is a plan view of the yoke shown in elevation in Fig. 8. Fig. 10 is an axial sectional elevation through the arc welding assemblies shown in elevation at the left in Fig. 6; while Figs. 11 and 12 are sectional details thereof taken, respectively, at 11—11 and 12—12 of Fig. 10.

Referring to Fig. 1, there is shown a metal plate 10 formed into tubular configuration 10a with its opposite edges abutting as at 11, 12 in a substantially V-shaped seam 13 to be welded. Mounted above the seam is a welding unit 14 of the contactual, inert-gas-shielded arc type, which mounts a welding electrode 15 disposed above the seam 13. The welding electrode is jacketed by a hollow casing 16 through which an inert gas such as helium is supplied and is caused to flow downward under pressure as at 17 around the electrode 15 for shielding the arc during welding. On the interior of the tube 10 there is also mounted another welding unit 18 provided with an upwardly projecting welding electrode 19 disposed beneath the weld seam. This electrode is also jacketed by a hollow housing 20 through which an inert gas is supplied and expelled under pressure through jet apertures as at 21 against the inner surface of the tube and seam for providing an inert shielding atmosphere around the arc and weld junction during welding.

The pipe section 10 is propelled past the welding unit by driven combined feed and squeeze rolls as at 22, 23. Also for maintaining the tube seam 13 in alignment with the welding electrodes 15, 19 as the tubing is propelled past the same, there is mounted above the tubing a guide wedge 24, the lower end of which extends into the V-notch of the tubular seam.

If only the upper welding unit 14 is energized to provide a welding arc between the electrode 15 and the metal of the tube along seam 13, a weld is produced having a sectional configuration about as shown at 25 in Fig. 2. As above explained, the weld seam thus produced has in cross section a concavely shaped upper or outer surface as at 26, and a convexly shaped or crowned lower or inner surface as at 27, which during solidification of the molten metal, contracts and draws away from the contiguous inner arcuate surfaces of the tubing as at 28, 29, to form grooves or recessed portions thereat as shown and as above described.

If, on the other hand, both the inner and outer weld units 14 and 18 are energized to weld the tube seam in accordance with the present invention, the arc provided by the inner electrode 19 welds the inner junction of the seam about as shown at 30 in Fig. 3, thus to produce a weld seam of slightly crowned or convex cross section along the inner surface of the tubing. As above stated, the inner welding unit 18 is preferably disposed sufficiently in advance of the outer welding unit 14 in the direction of traverse of the tubing so that the weld 30, Fig. 3, provided by the inner unit will have cooled to the point of solidification by the time it comes under the arc provided by the outer electrode 15. This electrode thereupon fuses the metal along the outer edges of the tube seam to form a weld having a sectional contour about as shown at 31 of Fig. 4. It will be observed that the weld 31 in addition to melting the outer contiguous edges of the tubing, also penetrates sufficiently into the weld 30 formed by the inner arc to melt and reflow a certain portion thereof as indicated by the dotted portion 31a. Ordinarily the inner and outer arcs are of such intensity as to produce weld junctures 30 and 31 which penetrate to a depth of about 75 to 85% of the thickness of the tubing.

It will be observed that the weld 31 produced by the outer electrode 15 is also crowned or convex in cross section. In each instance the crowned exposed contours of the inner and outer welds 30 and 31 coalesce smoothly with the adjacent surfaces of the metal tube, with no tendency to draw away or recess on cooling in the manner shown at 28, 29 of Fig. 2. This results from the squeezing pressure exerted on the abutting edges of the tubing by the feed and pressure rolls 22, 23, as supplemented for the inner weld 30 by the pressure of the inert gas directed upwardly through the nozzles 21 against the weld zone. For the outer weld 31 the crowned configuration of the outer surface results also from the squeezing action of the feed and pressure rolls 22, 23 and also from the support provided by the now solidified inner weld 30.

In consequence of the composite weld joint 30, 31 thus produced, when the welded tubing is subsequently cold drawn and swaged in the conventional manner, the weld joint is cold worked, compressed and contoured precisely in accordance with the arcuate contour of the contiguous inner and outer surfaces of the tubing to produce the finished joint as illustrated at 32 in Fig. 5.

Reference will now be had to Figs. 6–12, inc., of the drawings, illustrative of the invention as applied to the continuous welding of tubing formed from initially flat strip. Referring to these drawings, the initially flat metal strip 110 to be converted into tubing, is fed through a guide 101 and thence between successive pairs of forming rolls 111–115, inc., mounted on roll stands as at 116a to 116c, whereby the strip is progressively formed into tubular configuration in the manner shown in Figs. 6, 6a and 7. The final roll pair 115 of this series does not bring the opposed strip ends 116, 117 into abutment, this being accomplished by the succeeding roll stand 116d in which a series of three squeeze rolls 121, 122, 123 are rotatably mounted at equal angles of 120° to each other in a yoke 124 as shown most clearly in Fig. 8. The roll shafts, as at 125, are journaled to bearing blocks as at 126, 127 which are slidable in guideways of the yoke 124 and are adjustable by means of threaded bolts and lock nuts as at 128, 129 for adjusting and centering the tube aperture formed by the rolls.

Referring to Fig. 7, it will be noted that in passing from the roll pair 114 to the final squeeze rolls 121–123, the opposed strip edges 116, 117 converge along a V-notch to a junction point of abutment beneath the squeeze rolls. For assuring that the welding electrodes of the welding units discussed below, will be maintained in alignment with the tube seam, a sapphire wedge 129a extends into this V-notch a short distance, i. e., about 6" in advance of the junction point. This wedge may be mounted in any convenient manner, such for example, as on a bracket 129b bolted to the roll stand 116c as at 129c.

The tubing upon passing through the squeeze rolls 121–123, passes thence between a pair of arc welding units indicated generally at 150, 151, mounted, respectively, exteriorly and interiorly of the tubing along the weld seam and in vertical alignment therewith in the manner most clearly shown in Figs. 10, 11 and 12. These units are preferably of the contactual, inert-gas-shielded arc type, employing non-consumable electrodes of thoriated tungsten or equivalent. The external welding unit 150 is of more or less conventional construction for producing an inert-gas-shielded arc. It comprises in its essentials a vertical support 152, Fig. 6, on which is mounted an offset arm 153 on which in turn is vertically mounted a hollow electrode holder 154 terminating in a nozzle 155, Figs. 10 and 12, for directing about an axially mounted non-consumable electrode 156, of thoriated tungsten or the like, a shielding blanket or atmosphere of an inert gas, such as argon, helium, etc.

The arc weld unit 151 which is disposed interiorly of the tubing 132, comprises a metal electrode holder 160 of semi-cylindrical configuration, the cylindrical portion of which is encased in an insulating shell 161 and the upper portion of which is drilled for reception of a collet 162, in an axial bore of which the electrode 163 is mounted.

Member 160 is provided with connecting passageways, as at 164, 165, for circulation of a coolant such as cold water, supplied over inlet and outlet pipe lines 116, 171. Member 160 is also provided with a series of gas outlets, as at 168, 169, connecting to a supply passage 170 for supplying to the arc an atmosphere of an inert gas which is furnished over a gas pipeline 171 connected to passageway 170. The entire unit 151 is mounted on a support arm 172 which extends back to a point between the roll pairs 113, 114 at which the converging strip edges 116, 117 are spaced sufficiently apart to permit of the insertion of a cantilever mounting 173, Fig. 7, therefor. This mounting comprises a transversely extending stud shaft 174 bolted at its ends to the roll housing 116b as at 175, 176 and having slidably mounted thereon a bracket 177 held by a clamping bolt 178. The bracket has formed in its lower end a sleeve (not shown) through which the supporting arm 172 extends, and to which the supporting arm 172 is secured by welding or otherwise. Arm 172 is longitudinally slotted as at 180, Fig. 7, to provide space for projection of the upper roll of pair 114 therethrough and against the tubing being formed. The water and gas lines 166, 167, 171 extend back along the tubing 132 and find outlet at 181 via a supporting bracket 182 mounted on the roll housing 116a, Fig. 6.

The arc welding units 150, 151 function to weld the tubing along the interior and exterior portions of the seam in the identical manner above described with reference to Figs. 1, 3 and 4.

Reverting to Fig. 12 of the drawings, the preferable positionings of the exterior welding unit 150 and the interior welding unit 151, are as therein shown, namely, with the exterior and interior welding electrodes 156, 163 in vertical alignment with each other and with the tube seam, as viewed in end elevation in accordance with the Fig. 12 showing. However, the advantages of the invention may be obtained for other than this vertical alignment positioning of the aforesaid components, such, for example, as would result from rotating the entire assembly of Fig. 12 about the tube axis to any angle between the vertical and the horizontal. Preferably the exterior welding unit 150 should be so disposed that its welding electrode 156 is positioned above the center line of the tube seam and directed downwardly toward the same in slightly spaced relation, while the interior welding unit 151 should be so disposed that its welding electrode 163 is positioned below the center line of the tube seam and directed upwardly toward the same in slightly spaced relation. Although ordinarily in all such positionings, the inner and outer electrodes 156, 163 will be disposed in alignment, this need not necessarily be the case, in that these electrodes may be disposed in variably inclined relation to each other.

This application is a continuation-in-part of my application Serial No. 274,249, filed February 29, 1952, now Patent 2,669,639, granted February 16, 1954.

What is claimed is:

1. Apparatus for welding metal tubing having a longitudinally extending seam of abutting edges disposed at an angle to the horizontal, comprising: means for feeding said tubing progressively past a pair of arc welding units mounted, respectively, above and below the pass line of said seam, said upper welding unit mounting a non-consumable welding electrode positioned above the center line of said seam and directed downwardly thereagainst in slightly spaced relation, and said lower welding unit mounting a non-consumable welding electrode positioned below the center line of said seam and directed upwardly thereagainst in slightly spaced relation, each said welding unit being provided with means for enveloping said welding electrode with an atmosphere of an inert gas, directed against said seam during welding.

2. The method of welding metal tubing formed with a longitudinally extending seam of abutting edges, which comprises: feeding said tubing with the abutting edges of said seam disposed at an angle to the horizontal, progressively past a pair of longitudinally spaced electric arcs disposed respectively above and below the center line of said seam, and conducting said feeding at such rate and in such direction as to fusion weld and solidify the lower portion of said seam and subsequently to fusion weld and solidify the upper portion of said seam.

3. The method of welding metal tubing formed with a longitudinally extending seam of abutting edges, and by means of apparatus including a pair of co-acting squeeze rolls and a pair of arc welding units provided with non-consumable welding electrodes, said arc welding units being longitudinally spaced in the direction of feed of said squeeze rolls, said method comprising: feeding said tubing progressively between said squeeze rolls with the abutting edges of said tubing seam disposed at an angle to the horizontal and with the electrodes of said arc welding units disposed respectively above and below the center line of said seam, and conducting said feeding at such rate and in such direction as to fusion weld and solidify the lower portion of said seam and subsequently to fusion weld and solidify the upper portion of said seam, while exerting sufficient pressure on said squeeze rolls to form projecting ribs of weld material along said seam both interiorly and exteriorly of the tubing.

4. The method of welding metal tubing formed with a longitudinally extending seam of abutting edges, which comprises: feeding said tubing with the abutting edges of said seam disposed in a substantially vertical plane, progressively past a pair of longitudinally spaced electric arcs disposed respectively above and below the center line of said seam, and conducting said feeding at such rate and in such direction as to fusion weld and solidify the lower portion of said seam and subsequently to fusion weld and solidify the upper portion of said seam.

5. The method of welding metal tubing formed with a longitudinally extending seam of abutting edges, and by means of apparatus including a pair of co-acting squeeze rolls and a pair of arc welding units provided with non-consumable welding electrodes, said arc welding units being longitudinally spaced in the direction of feed of said squeeze rolls, said method comprising: feeding said tubing progressively between said squeeze rolls with the abutting edges of said tubing seam disposed in a substantially vertical plane and with the electrodes of said arc welding units disposed respectively above and below the center line of said seam, and conducting said feeding at such rate and in such direction as to fusion weld and solidify the lower portion of said seam and subsequently to fusion weld and solidify the upper portion of said seam, while exerting sufficient pressure on said squeeze rolls to form projecting ribs of weld material along said seam both interiorly and exteriorly of the tubing.

References Cited in the file of this patent

UNITED STATES PATENTS

| | | |
|---|---|---|
| 512,604 | Coffin | Jan. 9, 1894 |
| 1,091,479 | Bucknam | Mar. 31, 1914 |
| 2,529,812 | Peters | Nov. 14, 1950 |
| 2,654,014 | Schaefer | Sept. 29, 1953 |
| 2,667,559 | Arnold | Jan. 26, 1954 |